United States Patent
Mitchell

(10) Patent No.: US 7,116,139 B2
(45) Date of Patent: Oct. 3, 2006

(54) APPARATUS AND METHOD FOR CONTROLLING OPERATION OF A PROCESSOR DEVICE DURING STARTUP

(75) Inventor: Michael Lane Mitchell, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 59 days.

(21) Appl. No.: 10/640,981

(22) Filed: Aug. 14, 2003

(65) Prior Publication Data

US 2004/0054884 A1 Mar. 18, 2004

Related U.S. Application Data

(60) Provisional application No. 60/410,908, filed on Sep. 13, 2002.

(51) Int. Cl.
*H03L 7/00* (2006.01)
(52) U.S. Cl. ............... 327/142; 327/143; 327/178
(58) Field of Classification Search ................ 327/143, 327/198
See application file for complete search history.

(56) References Cited

U.S. PATENT DOCUMENTS

| | | | | |
|---|---|---|---|---|
| 4,142,118 A | * | 2/1979 | Guritz | 327/72 |
| 4,245,150 A | * | 1/1981 | Driscoll et al. | 377/32 |
| 4,429,236 A | * | 1/1984 | Nitschke | 327/87 |
| 4,746,820 A | * | 5/1988 | Fey | 327/47 |
| 4,754,166 A | * | 6/1988 | Nagano | 327/143 |
| 4,788,462 A | * | 11/1988 | Vesce et al. | 327/546 |
| 5,144,159 A | * | 9/1992 | Frisch et al. | 327/198 |
| 5,426,776 A | * | 6/1995 | Erdman | 714/55 |
| 6,181,173 B1 | * | 1/2001 | Homol et al. | 327/143 |
| 2004/0189358 A1 | * | 9/2004 | Kang | 327/143 |

* cited by examiner

*Primary Examiner*—My-Trang Nu Ton
*Assistant Examiner*—Hiep Nguyen
(74) *Attorney, Agent, or Firm*—W. James Brady, III; Frederick J. Telecky, Jr.

(57) ABSTRACT

An apparatus for controlling operation of a processor device during startup of the processor device includes: (a) a signal treating circuit receiving a voltage supply signal at a voltage supply locus; the signal treating circuit using the voltage supply signal for generating a first treated signal and a second treated signal; and (b) an output circuit coupled with the signal treating circuit; the output circuit receiving the first treated signal and the second treated signal and generating a control signal at an output locus based upon a relationship between the first treated signal and the second treated signal; the output locus being coupled with the processor device; the control signal effecting the controlling.

18 Claims, 4 Drawing Sheets

APPARATUS AND METHOD FOR CONTROLLING OPERATION OF A PROCESSOR DEVICE DURING STARTUP

This application claims benefit of prior filed copending Provisional Patent Application Ser. No. 60/410,908, filed Sep. 13, 2002.

BACKGROUND OF THE INVENTION

The present invention is directed to controlling operation of a processor device during startup of the processor device, and especially to reset supervisor apparatuses that await a stable supply signal in effecting such processor device control.

Often in operation of processor devices, and especially in processor devices in embedded systems, the power-up of the supply voltage is not a clean event. That is, the supply voltage is not sufficiently stable immediately after power-up to reliably operate a processor device. Such initial instability of supply voltage is especially present in battery operated systems because the insertion of a battery often causes significant ringing, "glitching" or other disadvantageous anomalies in the supply signal. An example of such noise on a supply line is illustrated in FIG. 1.

By way of further example, and not by way of limitation, in products with on-off switches contact bounce of the switch can also cause unclean power-up of the supply signal. If the power-up evolution involves too much noise or other signal anomalies a processor may experience a brownout condition. A brownout condition is generally considered to be an errant condition of the processor that requires a reset operation to be performed before the processor behaves as expected. The processor is sometimes said to be "lost" or "off in the weeds" during a brownout condition.

Some type of reset supervisor apparatus may be employed to control the reset pin of the processor to avoid a brownout condition. One such reset supervisor apparatus is a supply voltage supervisor (SVS) circuit that can hold the processor in a reset condition (i.e., reset the processor) until the supply voltage reaches a predetermined voltage. Such SVS circuits also reset the processor after the processor begins operation if the supply voltage dips below the predetermined voltage. A problem with prior art SVS circuits has been that the threshold level at which an SVS circuit operates often does not fit well with the system with which it is employed. For example, the predetermined threshold voltage may be lower than the minimum operating voltage of the processor monitored by the SVS circuit, or the predetermined threshold voltage may be higher than the desired operating voltage of the predetermined voltage or of the system within which the processor is included.

There is a need for an apparatus and method for controlling operation of a processor during startup that is independent of the level of the supply voltage provided to a processor device.

There is a need for an apparatus and method for controlling operation of a processor during startup that provides a reset to the processor based on stabilization of the supply voltage and not based on a predetermined threshold value.

SUMMARY OF THE INVENTION

An apparatus for controlling operation of a processor device during startup of the processor device includes: (a) a signal treating circuit receiving a voltage supply signal at a voltage supply locus; the signal treating circuit using the voltage supply signal for generating a first treated signal and a second treated signal; and (b) an output circuit coupled with the signal treating circuit; the output circuit receiving the first treated signal and the second treated signal and generating a control signal at an output locus based upon a relationship between the first treated signal and the second treated signal; the output locus being coupled with the processor device; the control signal effecting the controlling.

A method for controlling operation of a processor device during startup of the processor device includes the steps of: (a) in no particular order: (1) providing a signal treating circuit; and (2) providing an output circuit coupled with the signal treating circuit; (b) operating the signal treating circuit to receive a voltage supply signal at a voltage supply locus; (c) operating the signal treating circuit to use the voltage supply signal for generating a first treated signal and a second treated signal; (d) operating the output circuit to receive the first treated signal and the second treated signal; (e) operating the output circuit to generate a control signal at an output locus; the control signal being based upon a relationship between the first treated signal and the second treated signal; and (f) providing the control signal to the processor device for effecting the controlling.

It is, therefore, an object of the present invention to provide an apparatus and method for controlling operation of a processor during startup that is independent of the level of the supply voltage provided to a processor device.

It is a further object of the present invention to provide an apparatus and method for controlling operation of a processor during startup that provides a reset to the processor based on stabilization of the supply voltage and not based on a predetermined threshold value.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
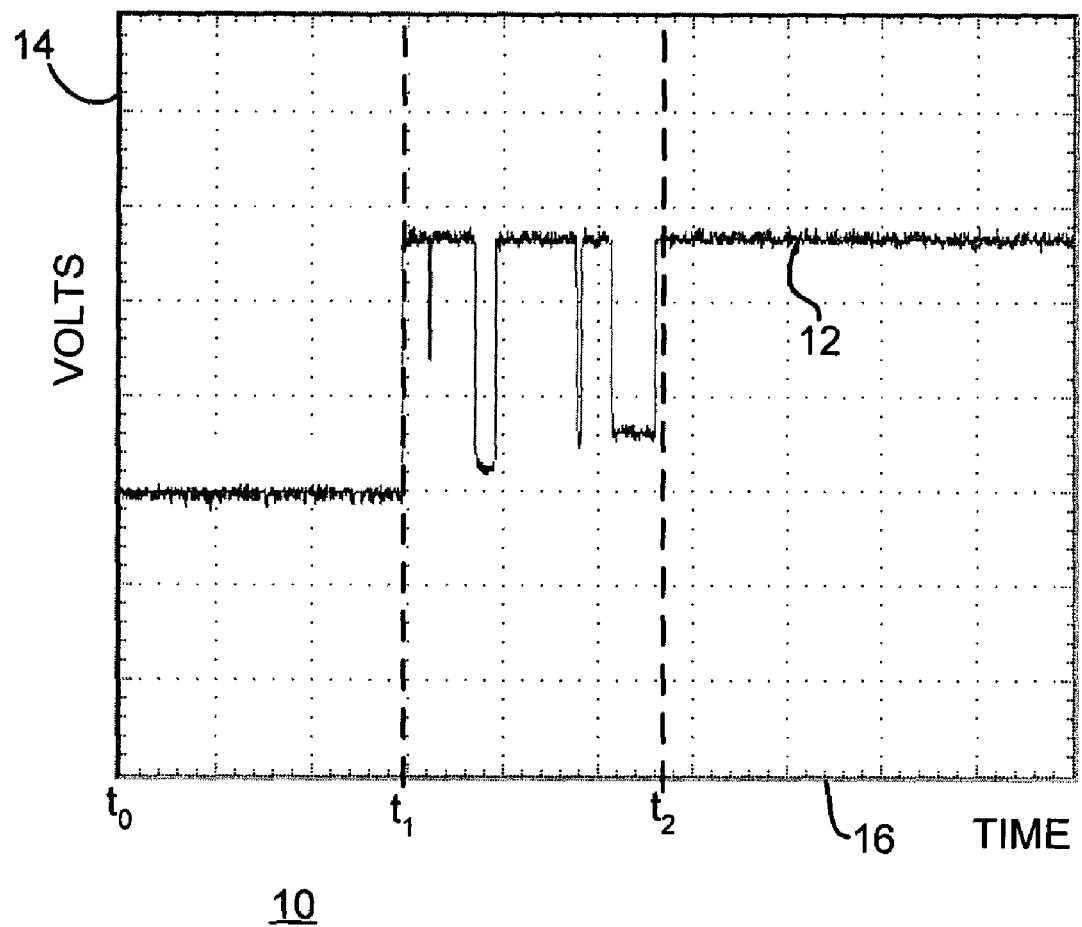
FIG. 1 is a graphic representation of disadvantageous anomalies in a supply signal that may occur when a battery is inserted into a circuit.

FIG. 1 is a graphic representation of disadvantageous anomalies in a supply signal that may occur when a battery is inserted into a circuit. In FIG. 1, a graphic plot 10 illustrates a curve 12 representing a voltage signal measured according to volts indicated on a first axis 14 as a function of time indicated on a second axis 16. Curve 12 illustrates response of a voltage supply signal at power up of a battery powered device (not shown in FIG. 1). Curve 12 is at a minimal level during a time interval $t_0$–$t_1$, during which time the battery (not shown in FIG. 1) is not included in the battery powered device. Substantially at time $t_1$, the battery is inserted into the device and curve 12 increases sharply.

During a time interval $t_1$–$t_2$, curve 12 experiences significant variance, indicating significant ringing, "glitching" or other disadvantageous anomalies or noise in the supply signal represented by curve 12. During times following time $t_2$, curve 12 is substantially level at a constant voltage value, indicating that supply voltage has settled to a stable value.

Figure 2:
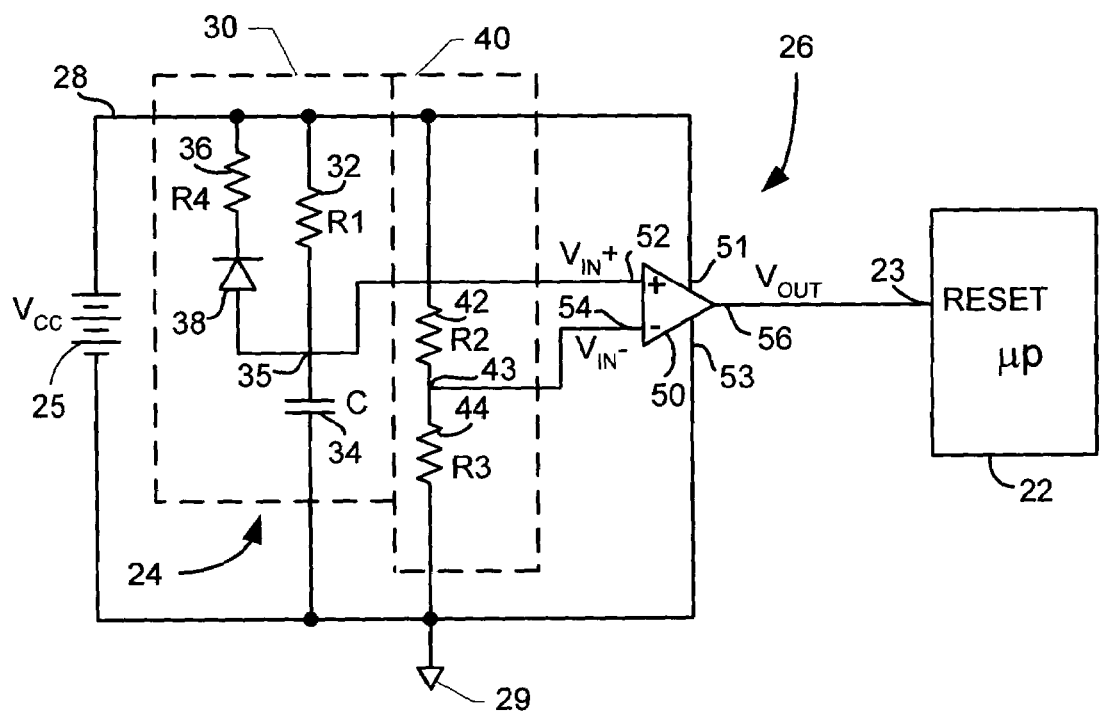
FIG. 2 is an electrical schematic diagram illustrating the preferred embodiment of the apparatus of the present invention.

FIG. 2 is an electrical schematic diagram illustrating the preferred embodiment of the apparatus of the present invention. In FIG. 2, an apparatus 20 for controlling operation of a processor 22 during startup includes a signal treating circuit 24 and an output circuit 26.

Signal treating circuit 24 includes a time-delay circuit 30 and a non-delay circuit 40. Time delay circuit 30 includes a resistor 32 and a capacitor 34 coupled in series between a voltage supply locus 28 and ground 29. A battery 25 is coupled between voltage supply locus 28 and ground 29 to provide a voltage supply signal $V_{CC}$ to apparatus 20. Resistor 32 and capacitor 34 impose an RC (resistor-capacitor) time constant delay on signals traversing time delay circuit 30. A resistor 36 coupled in series with a reverse-biased diode 38 between capacitor 34 and voltage supply locus 28 provides a fast discharge path for capacitor 34. The fast discharge path through diode 38 and resistor 36 permits apparatus 20 to react quickly to negative excursions or "glitches" in voltage supply signal $V_{CC}$ during operation when it may be necessary to reset processor device 22. Non-delay circuit 40 includes resistors 42, 44 coupled in series between voltage supply locus 28 and ground 29.

Output circuit 26 includes a comparator 50. Comparator 50 receives a positive supply voltage $V_+$ at a positive supply locus 51 and receives a negative supply voltage $V_-$ at a negative supply locus 53. Comparator 50 receives input signals at a non-inverting input locus 52 (input signal $V_{IN}+$) and at an inverting input locus 54 (input signal $V_{IN}-$). Comparator 50 presents an output signal (output signal $V_{OUT}$) at an output locus 56. Comparator 50 receives time-delayed signal $V_{IN}+$ at non-inverting input locus 52 from a juncture 35 between resistor 32 and capacitor 34 in time delay circuit 30. Comparator 50 receives non-delayed signal $V_{IN}-$ at inverting input locus 54 from a juncture 43 between resistors 42, 44 in non-delay circuit 40. The voltage divider effect of resistors 42, 44 ensures that input signal $V_{IN}-$ arriving at inverting input locus 54 is less than supply voltage $V_{CC}$. The time-delay effect of the RC circuit established by resistor 32 and capacitor 34 ensures that the level of input signal $V_{IN}+$ appearing at non-inverting input locus 52 will rise relatively gradually over time as compared to the rate of increase of input signal $V_{IN}-$ appearing at inverting input locus 54. Thus, when power is initially supplied to apparatus 20 (e.g., as by inserting a battery or by closing a switch) output signal $V_{OUT}$ presented by comparator 50 at output locus 56 is low because the potential of input signal $V_{IN}+$ at non-inverting input locus 52 is less than the potential of input signal $V_{IN}-$ at inverting locus 54. Output locus 56 is coupled with a reset pin or reset control pin 23 of processor 22. A low output signal $V_{OUT}$ presented by comparator 50 at output locus 56 (as is the case when power is first provided to apparatus 20) applies a low signal to reset control pin 23 and holds processor 22 in a reset condition.

Delay imposed by time-delay circuit 30 and the amount of voltage dividing effected by non-delay circuit 40 may be adjusted to ensure that only after voltage supply signal $V_{CC}$ has stabilized does non-inverting input locus 52 experience a higher potential than is present at inverting input locus 54 so that comparator 50 will present a high output signal $V_{OUT}$ at output locus 56. Presence of a high output signal $V_{OUT}$ at output locus 56 applies a high signal to reset pin 23, thereby releasing processor 22 for operation. Stabilization time experienced by apparatus 20 (i.e., the time period for which apparatus 20 can hold processor 22 in a reset state) is principally adjusted by selection of values for resistor 32 and capacitor 34, thereby adjusting the RC time constant of time-delay circuit 30. Values of resistors 42, 44 are preferably high to reduce current consumption by apparatus 20. In contrast, use of lower values for resistor 32 carries no penalty because no current flows through the resistor 32 after voltage supply signal $V_{CC}$ has stabilized.

If resistor 32 has a value of R1, resistor 42 has a value of R2, resistor 44 has a value of R3, resistor 36 has a value of R4 and capacitor 34 has a value of C, one may design apparatus 20 to hold processor 22 in a reset state (i.e., with output signal $V_{OUT}$ low) for a particular time interval (stabilization time of apparatus 20). By selection of R1, C, R2 and R3, a user can guarantee a reliable reset signal to processor 22 for a given dv/dt for voltage supply signal $V_{CC}$.

Voltages at comparator input loci 52, 54 are expressed:

$$V_{IN+} = V_{CC} - V_{CC} \times e^{-t/R1C} \quad [1]$$

and $$V_{IN-} = V_{cc} \times \frac{R3}{R2 + R3} \quad [2]$$

In order to the hold processor 22 in reset, one needs $V_{IN-} > V_{IN+}$. That yields:

$$V_{cc} \times \frac{R3}{R2 + R3} > V_{cc} - V_{cc} \times e^{-t/R1C} \quad [3]$$

Solving expression [3] for t:

$$t < -R1C \times \ln\left(\frac{R2}{R2 + R3}\right) \quad [4]$$

From expression [4], one can calculate the amount of time processor 22 will stay in reset. Therefore, as long as voltage supply signal $V_{CC}$ ramps to a steady state in a faster time than the limit one can keep processor 22 in reset, one can be guaranteed of a reliable reset.

Reverse-biased diode 38 and resistor 36 provide a fast discharge path for capacitor 34. This fast discharge permits apparatus 20 to react quickly to negative excursions or glitches in voltage supply signal $V_{CC}$ during normal operation which may make it desirable to reset processor 22. Resistor 36 allows a user to tune the response time of apparatus 20 for any supply voltage glitches that are expected. Removal of resistor 36 permits the fastest response time by apparatus 20 to variations in voltage supply signal $V_{CC}$, but may result in undesired resets for processor 22.

The current consumption of apparatus 20 is about 1 µA (1 microampere; current consumption of comparator 50) plus the current through resistors 42, 44. Generally, the current consumption by apparatus 20 can be kept low, making apparatus 20 practical for use with battery-operated systems. Apparatus 20 costs less to manufacture than many dedicated SVS (supply voltage supervisor) systems.

Figure 3:
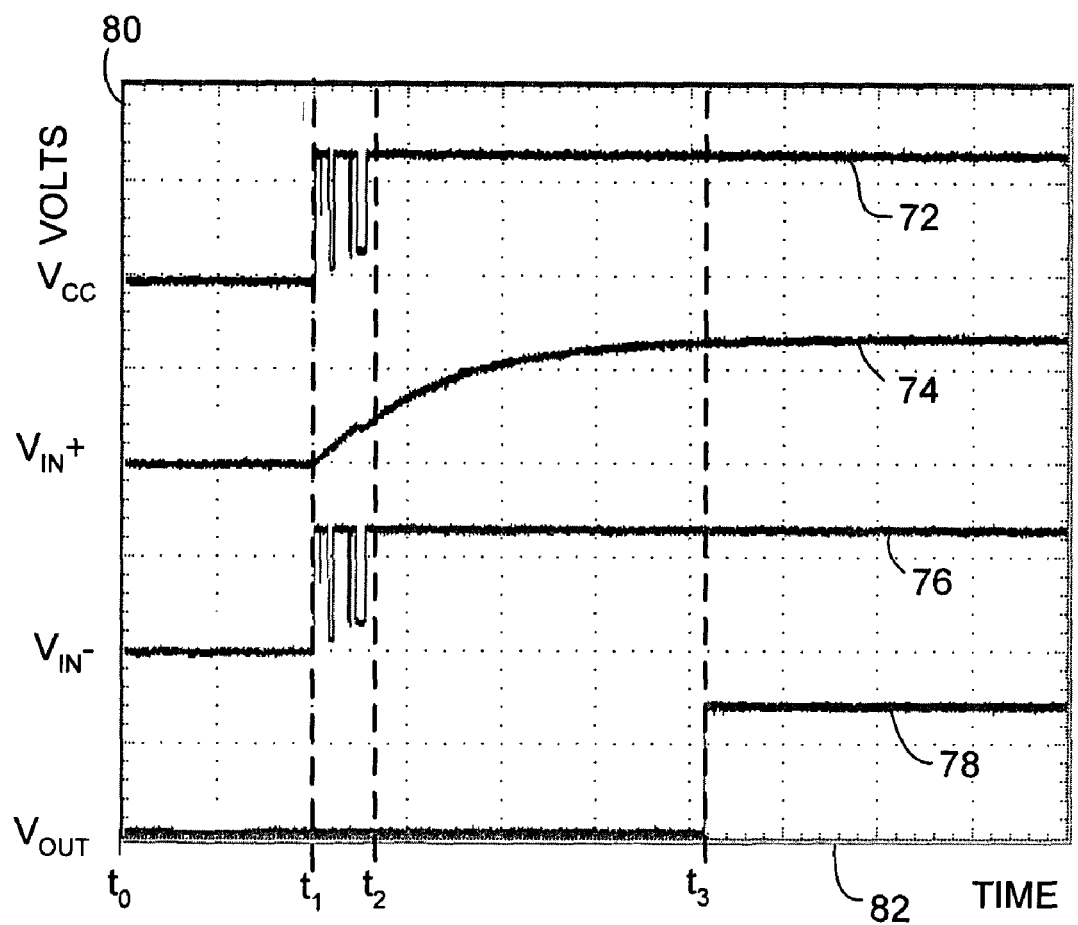
FIG. 3 is a graphic representation of a variety of signals within the apparatus illustrated in FIG. 2 during start up.

FIG. 3 is a graphic representation of a variety of signals within the apparatus illustrated in FIG. 2 during start up. In FIG. 3, a graphic plot 70 illustrates a curve 72 representing voltage supply signal $V_{CC}$, a curve 74 representing input signal $V_{IN}+$ (FIG. 2), a curve 76 representing input signal $V_{IN}-$ (FIG. 2) and a curve 78 representing output signal $V_{OUT}$ (FIG. 2). Curves 72, 74, 76, 78 are measured according to volts indicated on a first axis 80 as a function of time indicated on a second axis 82.

Curve 72 illustrates response of a voltage supply signal $V_{CC}$ at power up of apparatus 20 (FIG. 2). Curve 72 is at a minimal level during a time interval $t_0-t_1$, during which time battery 25 is not included in apparatus 20. Substantially at time $t_1$, battery 25 is inserted into apparatus 20 and curve 72 increases sharply. During a time interval $t_1-t_2$, curve 72 experiences significant variance, indicating significant ringing, "glitching" or other disadvantageous anomalies or noise in voltage supply signal $V_{CC}$ represented by curve 72. During times following time $t_2$, curve 72 is substantially level at a constant voltage value, indicating that voltage supply signal $V_{CC}$ has settled to a stable value.

Curve 74 illustrates response of input signal $V_{IN}+$ presented at non-inverting input locus 52 (FIG. 2). Curve 72 is at a minimal level during a time interval $t_0-t_1$, during which time battery 25 is not included in apparatus 20. Substantially at time $t_1$, battery 25 is inserted into apparatus 20 and curve 74 begins to rise or increase. The rate of increase of curve 74 during time interval $t_1-t_3$ is less than the substantially immediate increase of curve 72 at time $t_1$. The lesser rise rate of curve 74 vis-à-vis curve 73 reflects the influence of the RC time constant imposed by time delay circuit 30 (FIG. 2) on input signal $V_{IN}+$.

Curve 76 illustrates response of input signal $V_{IN}-$ presented at inverting input locus 54 (FIG. 2). Curve 76 is at a minimal level during a time interval $t_0-t_1$, during which time battery 25 is not included in apparatus 20. Substantially at time $t_1$, battery 25 is inserted into apparatus 20 and curve 76 (representing input voltage signal $V_{IN}-$) increases sharply in a manner very similar to the behavior of curve 72 (representing voltage supply signal $V_{CC}$). This similarity of behavior of curve 76 as compared with curve 72 results from input signal $V_{IN}-$ being presented from non-delay circuit 40 (FIG. 2) so that no time delay is imposed upon input signal $V_{IN}-$. The voltage divider action performed by resistors 42, 44 (FIG. 2) ensures that input signal $V_{IN}-$ will have a lesser magnitude than is exhibited by voltage supply signal $V_{CC}$. During a time interval $t_1-t_2$, curve 76 experiences significant variance, indicating significant ringing, "glitching" or other disadvantageous anomalies or noise in input signal $V_{IN}-$ similar to noise present in voltage supply signal $V_{CC}$ represented by curve 72. During times following time $t_2$, curve 76 is substantially level at a constant voltage value, indicating that input signal $V_{IN}-$ has settled to a stable value.

Curve 78 illustrates response of output signal $V_{OUT}$ presented at output locus 56 (FIG. 2). Curve 78 is at a minimal level during a time interval $t_0-t_3$ because input signal $V_{IN}+$ is not greater than input signal $V_{IN}-$ during time interval $t_0-t_3$. During time interval $t_0-t_3$ when output signal $V_{OUT}$ is low, reset pin 23 of processor device 22 (FIG. 2) is kept low so that processor device 22 is kept in a reset orientation and excursions of voltage supply signal $V_{CC}$ do not affect operation of processor device 22. Substantially at time $t_3$, input signal $V_{IN}+$ exceeds input signal $V_{IN}-$ for the first time. As a consequence, comparator 50 (FIG. 2) generates a high value for output signal $V_{OUT}$ (curve 78), reset pin 23 is set at a high value and processor device 22 is released from its reset orientation and is free to operate. Apparatus 20 holds processor device 22 in a reset orientation until voltage supply signal $V_{CC}$ is stabilized. Control of processor 22 by apparatus 20 is not dependent on any predefined supply voltage level or threshold, as is the case with prior art supply voltage supervisor (SVS) apparatuses. Rather, apparatus 20 controls operation of processor device 22 based upon stabilization time of voltage supply signal $V_{CC}$.

Figure 4:
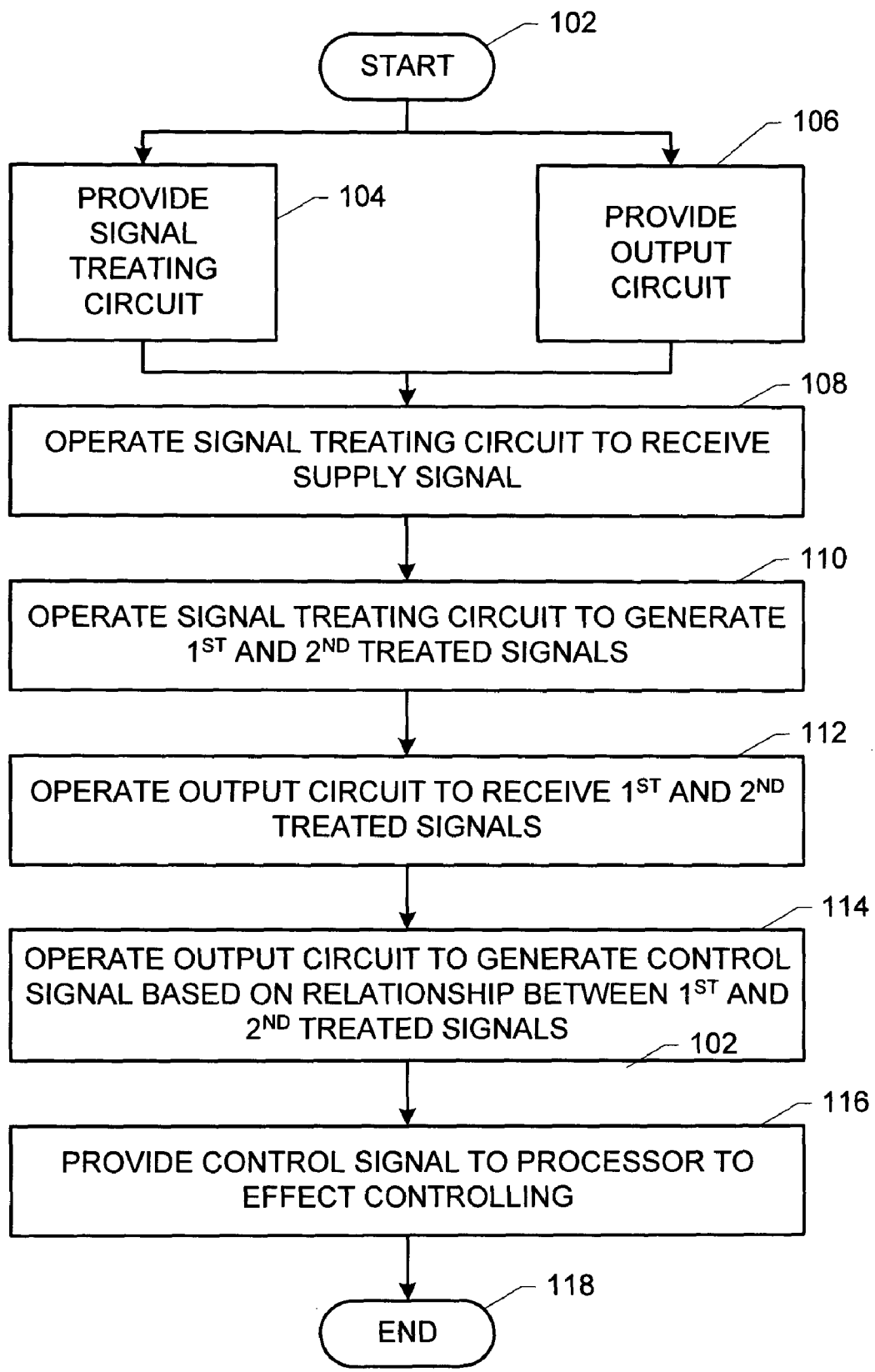
FIG. 4 is a flow diagram illustrating the preferred embodiment of the method of the present invention.

FIG. 4 is a flow diagram illustrating the preferred embodiment of the method of the present invention. In FIG. 4, a method 100 for controlling operation of a processor device during startup begins at a START locus 102. Method 100 continues with the step of, in no particular order: (1) providing a signal treating circuit, as indicated by a block 104; and (2) providing an output circuit coupled with the signal treating circuit, as indicated by a block 106. Method 100 continues with the step of operating the signal treating circuit to receive a voltage supply signal at at least one voltage supply locus, as indicated by a block 108. Method 100 continues with the step of operating the signal treating circuit to use the voltage supply signal for generating a first treated signal and a second treated signal, as indicated by a block 110.

Method 100 continues with the step of operating the output circuit to receive the first treated signal and the second treated signal, as indicated by a block 112. Method 100 continues with the step of operating the output circuit to generate a control signal at an output locus; the control signal being based upon a relationship between the first treated signal and the second treated signal, as indicated by a block 114. Method 100 continues with the step of providing the control signal to the processor device for effecting the controlling, as indicated by a block 116. Method 100 terminates at an END locus 118.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for generating a status signal on an output node according to a voltage applied between a power node and a ground node, the apparatus comprising:
    a comparator circuit with a first input node, a second input node, and a decision node coupled to the output node;
    a voltage divider circuit coupled between the ground node and the power node and having an output node coupled to the second input node of the comparator circuit;
    an RC circuit, comprising a first resistive element and a capacitive element coupled in series; the RC circuit coupled between the ground node and the power node; and an output node between the first resistive element and the capacitive element coupled to the first input node of the comparator circuit; and
    a discharge circuit coupled between the power node and the first input node of the comparator circuit.

2. The apparatus of claim 1, wherein the discharge circuit comprises a diode circuit coupled between the power node and the first input node of the comparator.

3. The apparatus of claim 2, wherein the diode circuit comprises a diode and a second resistive element coupled in series, the second resistive element coupled between the power node and a cathode of the diode, and an anode of the diode coupled to the first input node of the comparator.

4. The apparatus of claim 2, wherein the first resistive element comprises at least one resistor; and the capacitive element comprises at least one capacitor.

5. The apparatus of claim 2, wherein the apparatus is configured so that its power node and ground node may be coupled to a battery and the apparatus is part of a portable system.

6. The apparatus of claim 4, wherein the apparatus is configured so that its power node and ground node may be coupled to a battery and the apparatus is part of a portable system.

7. The apparatus of claim 2, wherein the apparatus is configured so that its output node may be coupled to a digital processor.

8. The apparatus of claim 5, wherein the apparatus is configured so that its output node may be coupled to a digital processor.

9. The apparatus of claim 6, wherein the voltage divider comprises at least two resistors coupled in series and the output node is between these at least two resistors.

10. The apparatus of claim 8, wherein the voltage divider comprises at least two resistors coupled in series and the output node is between these at least two resistors.

11. An apparatus for a digital processor system for generating a status signal on an output node according to a voltage applied between a ground node and a power node, the apparatus comprising:
   a comparator circuit with a first input node, a second input node, and a decision node coupled to the output node;
   a voltage divider circuit coupled between the ground node and the power node and having an output node coupled to the second input node of the comparator circuit; wherein the voltage divider comprises at least two resistors and the voltage divider output node is between the at least two resistors;
   an RC circuit, comprising a first resistive element and a capacitive element coupled in series; the RC circuit coupled between the ground node and the power node and having an RC circuit output node between the first resistive element and the capacitive element; the RC circuit output node coupled to the first input node of the comparator circuit; and
   a discharge circuit coupled between the power node and the first input node of the comparator; the discharge circuit comprising a second resistive element and a diode circuit; the second resistive element coupled between the power node and a cathode of the diode circuit; and an anode of the diode circuit is coupled to the first input node of the comparator.

12. A method for generating a power-on or reset status signal on an output node according to a supply voltage applied between a ground node and a power node, the method comprising the following steps:
   comparing a reference voltage with a second voltage to generate a decision result provided to the output node;
   generating the power-on or reset signal based on the decision result;
   generating the reference voltage on an output node of a voltage divider which is coupled between the power node and the ground node; the voltage divider comprising at least two resistive elements in series and the output node of the voltage divider is located between these at least two elements;
   generating the second voltage on an output node between a first resistive element and a capacitive element in an RC circuit as the capacitive element is charging or discharging responsive to the voltage between the power node and the ground node; wherein the RC circuit is coupled between the power node and the ground node; and
   discharging the capacitor by an alternative circuit when the supply voltage is resetting, where the alternative circuit is coupled between the power node and the output node of the RC circuit.

13. The method of claim 12, wherein the alternative circuit comprises a diode circuit coupled between the power node and the output node of the RC circuit.

14. The method of claim 13, wherein the diode circuit comprises a diode and a second resistive element coupled in series, the second resistive element coupled between the power node and a cathode of the diode, and an anode of the diode coupled to the output node of the RC circuit.

15. The method of claim 13 including a step of selecting the at least two resistive elements of the voltage divider to set the reference voltage to provide the decision result that will enable resetting a digital processor.

16. The method of claim 15 including a step of selecting a value of the first resistive element and a value of the capacitive element of the RC circuit to hold the digital processor in a reset state for a particular time interval.

17. The method of claim 16, wherein the supply voltage is provided by a battery and the method is used in a portable system.

18. The method of claim 13, wherein the output node couples to a digital processor.

* * * * *